United States Patent [19]

Smith et al.

[11] Patent Number: 4,774,659
[45] Date of Patent: Sep. 27, 1988

[54] COMPUTER SYSTEM EMPLOYING VIRTUAL MEMORY

[75] Inventors: James E. Smith, Stoughton; Gregory E. Dermer, Cottage Grove; Michael A. Goldsmith, Oregon, all of Wis.

[73] Assignee: Astronautics Corporation of America, Milwaukee, Wis.

[21] Appl. No.: 852,693

[22] Filed: Apr. 16, 1986

[51] Int. Cl.⁴ .................. G06F 13/00; G06F 12/00; G06F 12/08
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,412,382 | 11/1968 | Couleur et al. | 340/172.5 |
| 3,723,976 | 3/1973 | Alvarez et al. | 340/172.5 |
| 3,902,164 | 8/1975 | Kelley et al. | 340/172.5 |
| 4,037,215 | 7/1977 | Birney et al. | 364/200 |
| 4,096,568 | 6/1978 | Bennett et al. | 364/200 |
| 4,285,040 | 8/1981 | Carlson et al. | 364/200 |
| 4,356,549 | 10/1982 | Chueh | 364/200 |
| 4,388,685 | 6/1983 | Kotok et al. | 364/200 |
| 4,435,792 | 3/1984 | Bechtolsheim | 365/230 |
| 4,442,484 | 4/1984 | Childs, Jr. et al. | 364/200 |
| 4,453,230 | 6/1984 | Mizoguchi et al. | 364/900 |
| 4,519,032 | 5/1985 | Mendell | 364/200 |
| 4,527,232 | 7/1985 | Bechtolsheim | 364/200 |
| 4,532,586 | 7/1985 | Bratt et al. | 364/200 |
| 4,550,368 | 10/1985 | Bechtolsheim | 364/200 |
| 4,551,799 | 11/1985 | Ryan et al. | 364/200 |

FOREIGN PATENT DOCUMENTS 2149157 6/1985 United Kingdom .

OTHER PUBLICATIONS

James E. Smith, "Decoupled Access/Execute Computer Architectures", ACM Transactions on Computer Systems, vol. 11, No. 4, Nov., 1984, pp. 289–308.

Primary Examiner—Gareth D. Shaw
Assistant Examiner—Joseph T. Fitzgerald
Attorney, Agent, or Firm—Foley & Lardner

[57] ABSTRACT

A system and method for implementing virtual memory in a computer system, wherein a table containing entries indicative of the correlation of virtual memory addresses to physical memory addresses is maintained in main memory, and translation descriptors, derived from the translation table entries, for a variable group of virtual addresses, is maintained in a high speed memory. Portions of a virtual address to be translated are compared to the translation descriptors in the high speed memory. If a matching translation descriptor is found, the corresponding physical address is determined by combining a portion of the virtual address with a portion of the matching translation descriptor. If a matching descriptor is not found, a software algorithm is employed to generate a translation descriptor for the virtual address from the table in main memory. The generated translation descriptor is then installed in the high speed memory, the comparison repeated, and the corresponding physical address generated.

9 Claims, 10 Drawing Sheets

COMPUTER SYSTEM EMPLOYING VIRTUAL MEMORY

BACKGROUND OF THE INVENTION

The present invention relates to high speed computers utilizing virtual memory and, in particular, to methods for implementing virtual memory in a computer system.

Computer systems typically employ a hierarchy of memory devices to accommodate the often conflicting objectives of high speed and low cost. Specifically, a computer typically includes a relatively small main memory unit which comprises comparatively expensive high speed devices, augmented by a larger number of slower, but less expensive secondary memory drives such as rotating disk or magnetic tape storage. The main memory can be directly accessed by the system hardware; the secondary memory, however, is typically accessed through a software operating system. Transfers between main memory and secondary memory are made by the operating system as required.

A virtual memory system is a mechanism for supporting efficient management of the physical memory in a computer system. In such a system a conceptual "virtual memory" is referenced by computer programs to access data and instructions; a "virtual" or "logical" address is employed to denominate an abstract virtual memory location rather than a specific location in the physical memory. The computer system then dynamically correlates (maps) blocks of virtual addresses (typically referred to as "pages" of virtual memory) to correlative blocks (pages) of physical memory locations; at any given time, a mapping of virtual memory pages into physical memory pages is maintained in a table customarily referred to as a page table. A particular page of virtual memory may correlate to a specific page of main memory, or may instead be resident in secondary memory.

Under the control of the computer's operating system, the mapping of virtual to physical pages (and, consequently, the contents of the page tables) changes in accordance with demand. As a program executes its defined steps, instructions accessing memory refer to virtual memory locations. Computer hardware then, in conjunction with the page table, translates the virtual address to an actual physical address. If it is determined that the virtual address does not correspond to a location in the main memory, the hardware triggers a program trap (typically referred to as a page fault), stores indicia of the state of the processor at the time the instruction causing the page fault began execution, and relinquishes control to the operating system software. The operating system then accesses the page in secondary memory corresponding to the virtual memory page containing the referenced virtual address and transfers it into main memory. If necessary, the contents of another page of physical memory is transferred to secondary memory to accommodate entry of the new virtual page. The operating system the modifies the page tables to reflect the change, restores the processor values to the pre-trap state and passes control back to the original program. The original program can then access the desired virtual memory location and proceed with the program execution.

To facilitate direct processing of the page table by the processor hardware, prior art systems conventionally utilize hardware designed to implement a particular structure. This results in inflexibility of the design of page tables and requires that system's software to be adapted to the specific hardware table structure. In addition, page table structures tend to be particularly rigid in order to reduce hardware control complexity. More complex and flexible hardware page table structures that would accommodate variations in software are typically not used.

Retention of a number of recent virtual page to physical page translations in a processor buffer to facilitate address translation is, in general, known. Such a buffer is often referred to as a "translation look aside buffer." When a virtual to physical translation is required, the hardware first checks entries held in the buffer. If the desired mapping is present in the translation look aside buffer, the physical address is immediately available for use. Otherwise, the hardware consults the page tables in memory, and places an entry describing the most recent address translation into the translation look aside buffer for future reference. In the process, an older translation look aside buffer entry may be discarded.

The use of such a translation look aside buffer, however, is disadvantageous in a highly parallel computer system. Processor state values must be retained until it is determined that a page fault will not occur. That time period is unpredictable; translation of a virtual address in the translation look aside buffer is done quickly and within a predictable time, whereas translations in which the hardware must refer to the page tables take more time. Saving and restoring processor values is therefore complicated.

SUMMARY OF THE INVENTION

The present invention provides a particularly advantageous method for implementing virtual memory in a computer system. A high speed memory located in the processor contains translation descriptors relating a variable group of virtual addresses to physical addresses. The descriptors are loaded and maintained in the high speed memory by software. A table containing entries indicative of the correlation of virtual memory addresses to physical memory addresses is maintained entirely by software in main memory. The descriptors are derivable from the table entries. Predetermined portions of a virtual address to be translated are compared to the translation descriptors in the high speed memory. If a matching translation descriptor is found, indicia of the physical address are generated by combining a portion of the virtual address with a portion of the matching translation descriptor. If a matching descriptor is not found in the high speed memory, a trap will occur. At that time, a software algorithm is employed to generate a translation descriptor from the table in memory, and the generated translation descriptor is installed in the translation table. Upon return from the trap, the instruction is re-executed and the physical address corresponding to the virtual address generated.

BRIEF DESCRIPTION OF THE DRAWING

A preferred exemplary embodiment of the present invention will hereinafter be described with reference to the appended drawing, wherein like numerals denote like elements and.

Figure 1:
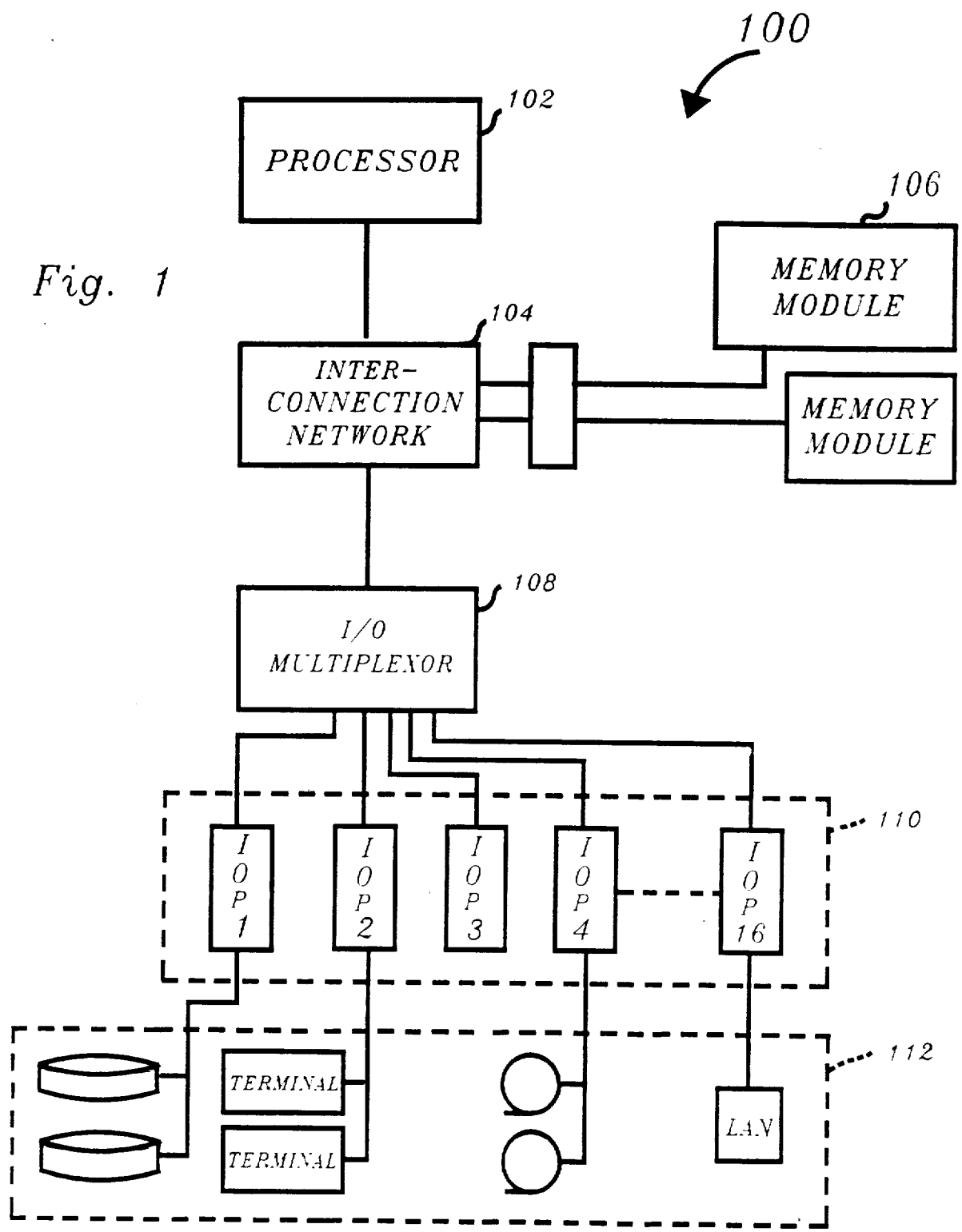
FIG. 1 is a schematic block diagram of a computer system employing the present invention.

It should be understood that while various of the connections between elements are shown in the drawing as single lines, they are not so shown in a limiting sense, and may comprise plural connections as is known in the art. Similarly, while various elements are shown in the drawing as single components, they may in fact comprise plural components as is known in the art.

DETAILED DESCRIPTION OF A PREFERRED EXEMPLARY EMBODIMENT

The present invention relates to computer systems employing virtual memory to provide efficient memory and I/O management in an interactive system environment. In the preferred exemplary embodiment, each process undertaken by the system has access to a 4 Gigabyte ("Gbyte") virtual memory, which is addressed with a 32 bit virtual (logical) address. The virtual address space is partioned into two halves: user space (in which each process has its own independent copy) and kernel space (which is shared among all the processes). Both real and virtual memory are divided into 64 Kilobyte ("Kbyte") pages, the basic unit for memory management and memory protection.

All memory accesses are performed utilizing 32 bit virtual addresses. Loads, stores and instruction fetches pass through an address translation pipeline enroute to memory. A translation table, contained in the address translation pipeline, provides "translation table descriptors" used to translate virtual addresses to real addresses. In the preferred embodiment the translation table contains 4096 translation descriptors. Hence, a total of 256 Megabytes can be mapped automatically by the hardware at any given time. In accordance with the present invention, the computer system simplifies the control paths by minimizing the number of cases handled by hardware. The hardware supports the high speed translation table, but software completely supports the page table in main memory. In the event of a "hit" (a successful virtual to real address translation), a virtual to real address translation is a single step process in the translation table.

Memory protection is implemented as part of the virtual memory system. The 64 Kbyte page is the basic unit for protection, and can be read or written depending on protection bits in its translation table descriptor and the operating mode of the CPU. The protection scheme provides protection at two levels: processes are protected from each other by providing them with separate virtual address spaces through use of process identifiers (PId) and individual pages are also protected. Privileged instructions are provided so that software can maintain the translation table.

Referring now to FIG. 1, a computer system 100 of a type suitable for use in implementing the present invention comprises a processor 102, a memory system 106, an interconnection network 104, an input/output (I/O) multiplexer, and a plurality of input/output processors 110, cooperating with various peripheral devices generally indicated as 112.

Processor 102 is suitably a 64-bit floating point processor; all major data paths, floating point registers and functional units are 64 bits wide. Normal precision (64 bit floating) floating point data is suitably represented by a one bit sign, an 11 bit biased exponent, and a 53 bit mantissa which includes an implied leading one. Where 64 bit precision is not required, 32 bit "half-precision" floating point computation is provided. Half-precision floating point data is suitably represented as a 24 bit mantissa, which includes an implied leading one, an eight-bit biased exponent, and a one bit sign.

As will hereinafter be more fully described in conjunction with FIGS. 2 and 4-7, processor 102 comprises the necessary registers, functional units, and control circuitry required to implement a decoupled system architecture and execute user and supervisory programs. Decoupled architecture separates machine instructions into two streams, one for memory and integer operations and the other for floating point operations. Each of the instructions streams is then processed separately. Further pipelined hardware processes instructions in an assembly-line fashion, with the hardware segmented to begin execution of a new operation every clock period. Processor 102 preferably employs decoupling and is highly pipelined to obtain high performance.

Processor 102 preferably includes a 128 Kbyte local memory operating as a two way set associative cache operatively interposed between processor 102 and memory unit 106. As will be explained, processor module 102 provides for a 4 Gbyte virtual memory.

Memory units 106 suitably comprise respective 256K dynamic MOS memory integrated circuits, each module holding from 32 to 128 Megabytes ("Mbytes") of data (preferably organized four words wide with 64 bits per word). If desired, a single error correction/double error detection (SECDED) check may be appended to each data word, and a diagnostic processor interface utilized to permit testing of memory and loading of deadstart code into memory 106. Memory modules 106 collectively provide a homogenous address space as used by the other system components. Central memory units 106 are preferably interleaved 16 ways, but the local/central memory hierarchy requires that only one memory reference may be active at a time in any memory module. However, independent control is advantageously provided for each memory module 106 so that two requests may be serviced concurrently.

I/O multiplexer 108 is utilized to divide memory bandwidth among a plurality of input/output processors 110, and to provide interrupt message facilities. I/O multiplexer 108 logically subdivides a port to memory 106 into independent channels, one for each I/O processor 110. The individual I/O processors 110 are connected through a standard bus to respective peripherals such as disk storage 112. I/O processors 110 communicate with each other and to processor 102 through messages in memory and interprocessor interrupts. The I/O multiplexer and I/O processors will be more fully described in conjunction with FIGS. 3, 3A, and 3B.

Communication between processor 102 and the various other components is effected through interconnection network 104. Interconnection network 104 suitably comprises a buffered switching network/multiplexer incorporating appropriate arbitrator logic to determine priorities of communication providing on the order of 480 Mbytes per second peak bandwidth.

Figure 2:
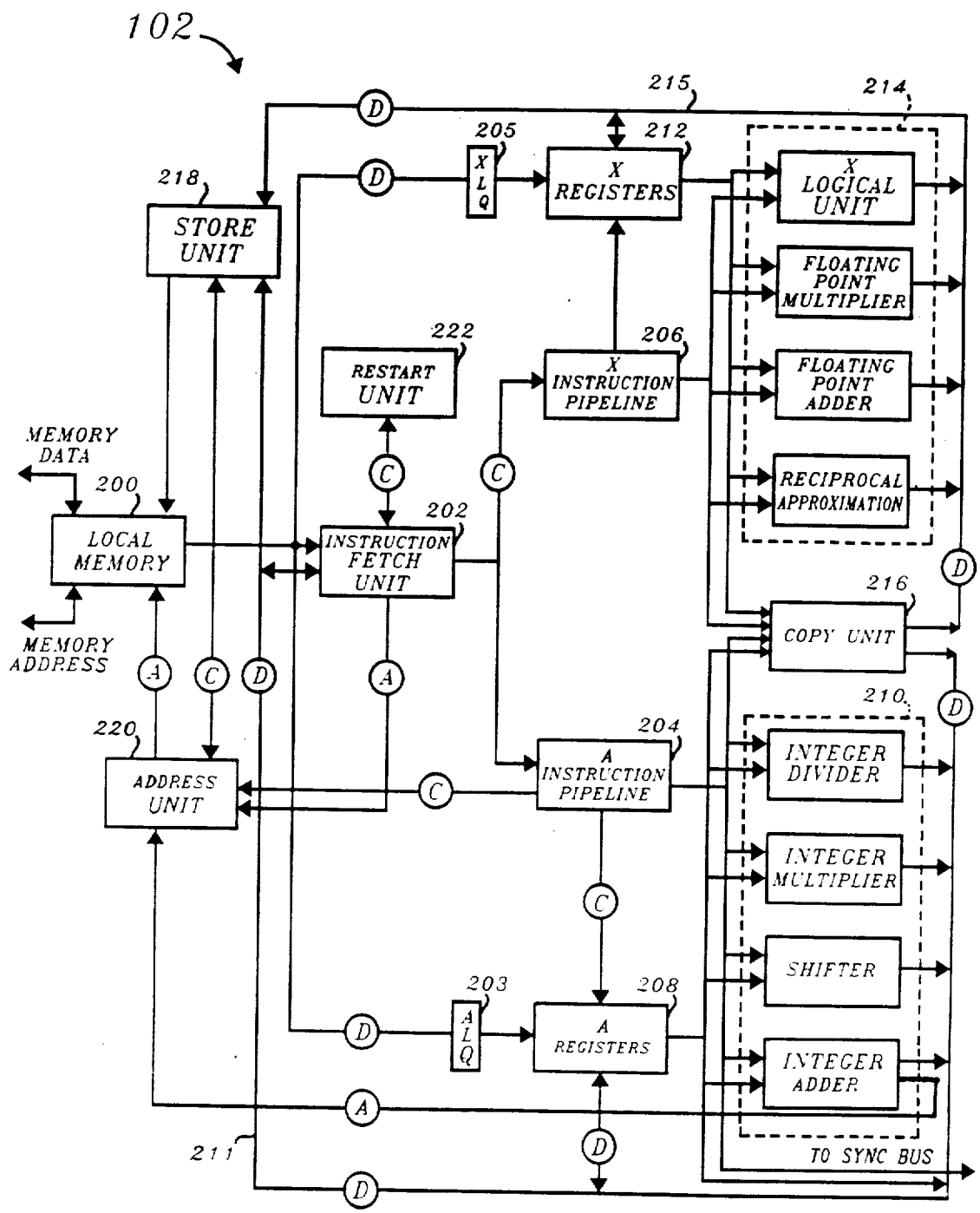
FIG. 2 is a schematic block diagram of the CPU of a computer system employing the present invention.

As previously noted, processor 102 includes the registers, functional units and control circuits necessary to implement a decoupled system architecture and to execute user and supervisory programs. Referring to FIG. 2, processor 102, preferably includes a local memory 200, implemented as a 128 Kbyte two-way set associative cache, effectively interposed between the remainder of processor 102 and memory 106. Local memory 200 selectively communicates with memory module 106 under the control of the operating system software and contains the instructions and data directly accessible by processor 102.

Local memory 200 also communicates with a suitable instruction fetch unit 202 and first and second queues 203 and 205, both first-in, first-out ("FIFO") queues. Instruction fetch unit 202 provides for accessing instructions from local memory 200, sequence control of the system, and decoupling of address and integer instructions (hereafter "A" type instructions) from floating point instructions (hereafter "X" type instructions). Instructions are fetched from local memory 200 by instruction fetch unit 202 at a maximum rate of two per clock, and are split into two (A, X) instruction streams, each processed by a separate associated instruction pipeline. An A instruction pipeline 204, operates on all integer computations, and all memory address computation and access. An X instruction pipeline 206 operates on all floating point instructions. A instruction pipeline 204 cooperates with a set of 31 64-bit registers 208 and with respective integer functional units, generally indicated as 210, such as an integer divider, integer multiplier, shifter, and integer adder. Similarily, instruction pipeline 206 cooperates with a set of 31 64 bit X registers 212, and respective floating point functional units, generally indicated as 214, such as a logical operation unit, a floating point multiplier, a floating point adder, and a reciprocal approximation unit. Functional units 210 and 214 are preferably highly pipelined, that is, sectioned with latching registers into stages.

A registers 208 and X registers 212 are used to hold information associated with the instructions, such as operands, addresses, and control information in the CPU. A registers 208 are used for all memory address computation and accessing, and X registers 212 are used for all floating point operations. The A and X registers provide fast temporary storage for 32 bit integer and 64 bit floating point numbers, respectively.

Instruction pipelines 204 and 206, like functional units 210 and 214, are highly pipelined and process instructions in an assemblyline fashion rather than completely finishing one instruction before starting the next. Floating point functional units 214 begin execution of a floating point addition or multiplication with a new set of operands every clock period, and a floating point reciprocal approximation every three clock periods. Further, the primary floating point functions are performed by logically independent units. Thus, faster floating point instructions can pass slower instructions during execution resulting in fewer occurrences of instructions being forced to wait for results of a previous instruction.

Fixed point operations include unsigned and integer arithmetic, logical operations, copies from an A register to an A register, copies to and from the A queues, and addressing for loads and stores to and from all of the queues. Operations defined on floating point data types include floating point arithmetic, logical operations, copies from X register to X register, and copies from the X queues.

A suitable copy unit 216 is provided to facilitate communication between the respective sets of registers.

Data is communicated from queues 203 and 205, registers 208 and 212, and functional units 210 and 214 to local memory 200 through an address unit 220 and store unit 218. As will be hereinafter more fully described in conjunction with FIG. 7, store unit 218 includes respective store queues corresponding to the respective processing pipelines, and address unit 220 contains a corresponding address queue to facilitate entry of data contained in the respective queues of store unit 218 into local memory 200. Such address queue suitably includes an appropriate tag to indicate whether the particular address entry is associated with the X store queue or the A store queue in store units 218.

All load and store instructions interact with memory through architectural queues 203, 205, 218 and all the functional instructions (arithmetical, computational, etc.) take operands from registers 208 and 212 or a load queue 203 and 205, and place the results in either a register 208, 212 or store queue 218. The queues act as the communication medium between the memory and the execution units. The two instruction streams are buffered separately and do not have to be processed in lock-step fashion. Elasticity provided by the queues in instruction buffering permits the access instruction stream to run ahead of the floating point stream, resulting in a major reduction in the memory access time as observed in the floating point units. This results in high performance on a scalar program.

A suitable restart unit 222 is also included to facilitate handling of interrupts and traps. Upon the occurrence of an interrupt, or trap condition, restart unit 222 assumes control of the system, storing the indicia of the processor state values and generating appropriate signals to initiate predetermined interrupt or trap routines in a manner well known in this art.

Address unit 220 receives virtual addresses from the other components of the A unit, and translates the virtual addresses into physical addresses, if the translation is available in an internal translation table. If the translation is not resident in the translation table, address unit 220 generates a signal to restart unit 222 indicative of a translation fault, causing restart unit 222 to initiate the translation fault trap routine in the operating system code to be executed, that is, to cause the operating system to adjust the contents of the translation table so that the desired address becomes resident. All memory accesses are effected using 32 bit virtual addresses.

Figure 4:
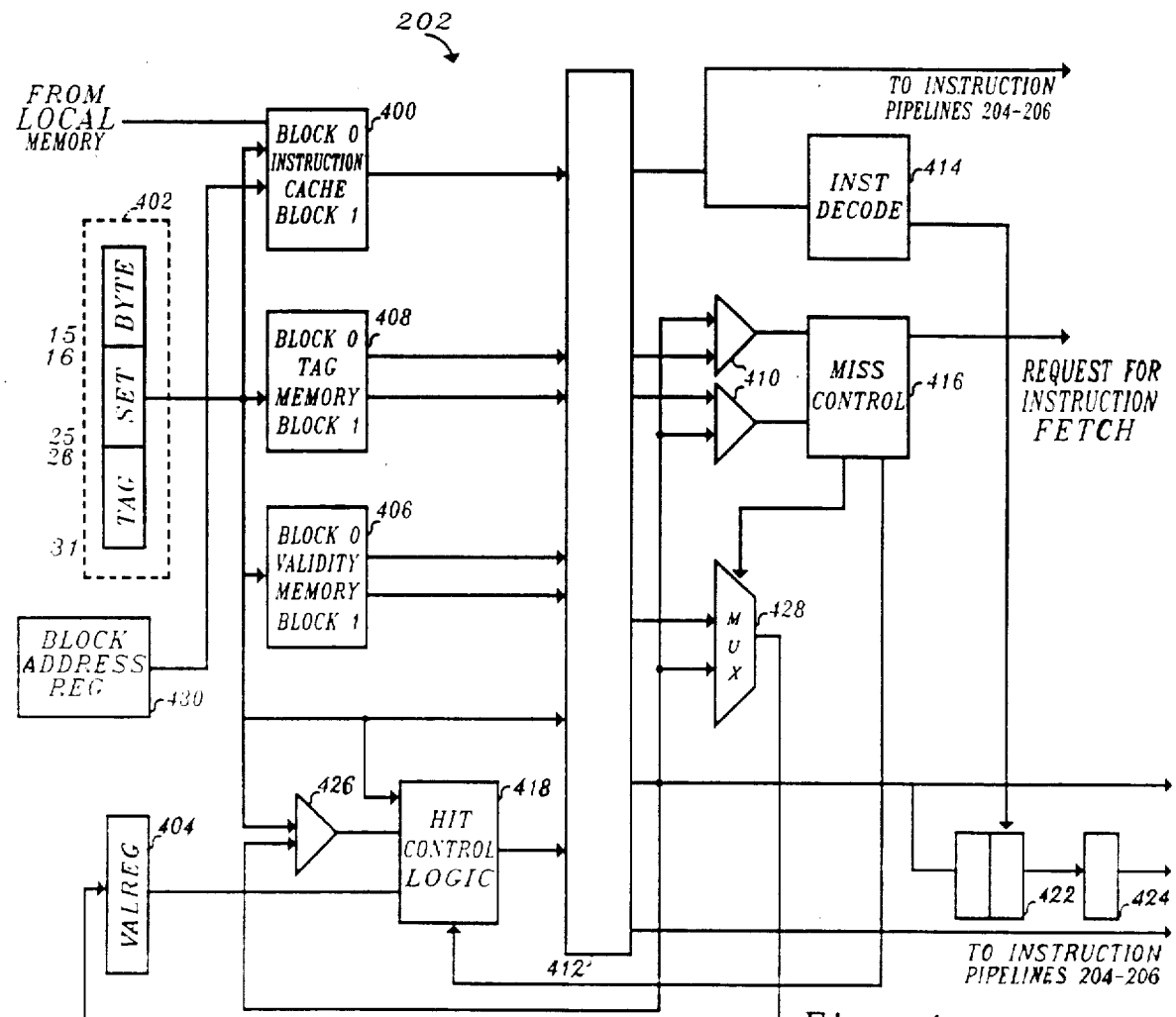
FIG. 4 is a schematic block diagram of the instruction fetch unit 202 of FIG. 2.

As previously noted, instruction fetch unit 202 provides for accessing instructions from local memory 200, sequence control of the system, and decoupling of A type and X type instructions. Referring now to FIG. 4, instruction fetch unit 202 suitably includes: a 2K by 64 bit instruction cache memory 400; a 32 bit program counter 402 (sometimes hereinafter referred to as the P-counter or P-register); a 4 bit current block validity bit register 404, a 16 by 40 bit tag memory 408; a 16 by 8 bit validity memory 406, respective comparators 410 and 426; suitable "MISS" control logic 416, and "HIT" control logic 418; a queue 422, (sometimes referred to as the P-buffer), and a control register 424; a 1 bit block address register 430; and a bank of latches 412.

Instruction cache memory 400 is utilized to maintain, and selectively provide, indicia of instructions to be executed by system 100. Cache 400 is arranged as a two-way set associative cache cooperating with local memory 200. The two major blocks of cache 400 are divided into sixteen sets of a predetermined number of locations. Each major block is further divided into a predetermined number of four minor blocks with each minor block consisting of sixteen words.

Tag memory 408 is utilized to maintain indicia of respective pairs of tags associated with each of the sets reflected in cache 400. Validity memory 406 similarly includes two entries corresponding to each of the sixteen sets reflected in cache 400. Each entry includes four validity bits corresponding to each major block of the set. The validity bit provides indicia of whether or not an entry has been made in the minor block.

Program counter 402 is utilized to control fetching of instructions; the contents of program counter 402 are the virtual address of the instruction to be executed. Program counter 402 is typically incremented by eight for each clock cycle, but may be inhibited by appropriate logic (not shown) or loaded from various sources such as a result bus 211 or restart unit 222 (communications not shown).

VALREG register 404 is used to store the validity memory entry of the major block presently being operated in.

Block address register 430 provides indicia of which block (block 0, block 1) of cache 400 the previously fetched instruction was in.

In operation, it is initially assumed that the present instruction reflected in P-counter 402 is within the same major block and set as the just previously fetched instruction. Accordingly, the contents of the instruction cache 400 location corresponding to the set minor block and word and block address field of P-counter 402 is read from cache 400 and temporarily stored in latch 412. The tag and set fields of the virtual address in P-counter 402 are compared against the tag and set fields of the last previous instruction (fed back from latch 412) by comparator 426. If the fields match, the assumption is deemed valid. The validity bit in VALREG 404 corresponding to the minor block designated by the minor block field of P-counter 402 is tested by hit control logic 418. If the validity bit is active (indicative that valid data is stored in the minor block of cache 400), hit control logic 418 generates an active "valid instruction" signal for application to A instruction pipeline 204 and X instruction pipeline 206, causing the instruction to be loaded into instruction queue 502, and a corresponding queue in X pipeline 206. If, however, the validity bit corresponding to the segment is not active, indicative that the minor block in cache 400 has not been loaded with valid instructions, queues 502 will not accept the instruction and an instruction fetch request is made to the memory system.

When, for example, a cross-over between major blocks occurs, the assumption that the present instruction is within the same set as the previous instruction would be erroneous. Accordingly, at the same time the instruction is read out from cache 400 in accordance with the assumption, the corresponding entries from both blocks 0 and 1 of tag memory 408 and validity memory 406 are read out and stored in latch 412, together with the virtual address from P-counter 402. During the next clock period, the tag fields from the respective blocks of tag memory 408 are compared by comparators 410 against the tag fields of the virtual address (now in latch 412). "MISS" control logic 416 determines which, if either, of the blocks provide the matching tag indicia. If the block not reflected in block address register 430 provides the matching tag and set indicia, the block address register 430 is loaded with the indicia of the proper major block, i.e., is toggled; and multiplexer 428 loads VALREG 404 with the entry in validity memory 406 corresponding to the matching major block.

On the next clock cycle, the instruction from the location in the new block is read, and the tag/set comparison performed in comparator 426. If the validity bit corresponding to the minor block tests active, hit control 418 generates the valid instruction signal, causing the instruction to be entered into the instruction queues of A pipeline 204 and X pipeline 206.

If, however, the comparison of the tag indicia from the respective blocks of tag memory 408 does not provide a match with the tag of the virtual address at issue, a fault signal is generated to effect transfer of a minor block (16 words) of instructions into cache 400, and to update tag memory 408 and validity memory 406.

At the same time the comparison is made between the tag fields by comparators 410, the virtual address from P-counter 402 is applied to P-buffer queue 422. If the instruction is a load or store type instruction, the virtual address is accepted and loaded into P-buffer queue 422. Control register 424 is utilized, in conjunction with P-buffer queue 422 to facilitate restart after an interrupt or trap routine has been effected.

Figure 5:
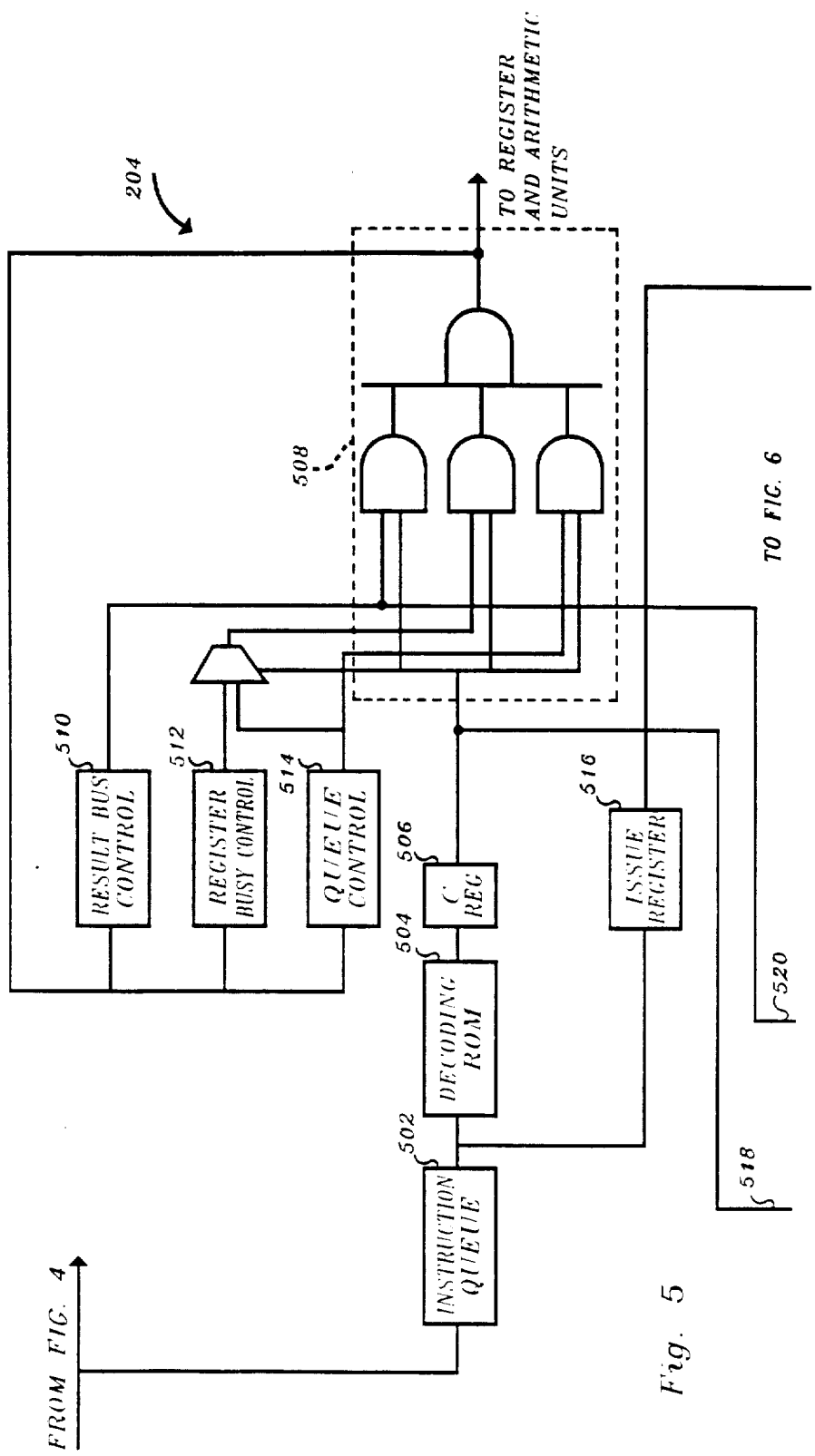
FIG. 5 is a schematic block diagram of the A instruction pipeline 204 of FIG. 2.

An instruction pipeline 204 processes the addressing and integer operations in processor 102. Similarly X instruction pipeline 206 processes all floating point operations in processor 102. Instruction pipelines 204 and 206 are substantially similar, and accordingly, only A pipeline 204 will be described. Referring now to FIG. 5, A instruction pipeline 204 receives instruction from the instruction fetch unit 202. Instructions are placed in a first-in-first-out queue 502. When a valid instruction is presented to instruction queue 502 by instruction fetch unit 202, assuming the queues are not full, the instruction is accepted both in instruction queue 502 of the A instruction pipeline 204 and a corresponding queue in X instruction pipeline 206. Instruction fetch unit 202 continues to fetch successive instruction words, as indicated by the contents of program counter 404 on each clock cycle, which are accepted in the instruction queues until either of the queues is filled, or is inhibited by blockage in successive stages of the respective instruction pipelines.

The instruction at the head of instruction queue 502 is preferably selectively advanced to an issue register 516 and to a decoding Read Only Memory (ROM) 504. ROM 504 translates the operation code of the instruction into a form that is more easily used by various successive stages of the pipeline.

The transformed operation code is then loaded into an issue register 506, also sometimes referred to as the C register, and the determination is made by combinational logic, generally referred to as 508, whether or not the instruction can proceed. The conditions that must be met before execution of instruction can commence are often referred to as issue conditions. There are numerous issue conditions that must be met. For example, A-result bus 211 is capable of transporting only a single value during a given clock period. Accordingly, a determination of the state of bus 211 is made by suitable A-result bus control logic 510, as is well known in the art. Result bus control unit 510 maintains indicia of the particular clock periods in which result bus 211 will be occupied. If the current instruction would conflict with a previous instruction with respect to bus usage, the execution of the instruction in issue register 506 is prevented during that clock period. Likewise, none of the registers involved in the instruction can be the destination of the results of an uncompleted previous instruction. Accordingly, indicia of the states of the various registers are maintained and tested by suitable A register busy control logic 512. Similarly, an instruction which utilizes one of the queues may not begin execution unless the queue is in an appropriate state, e.g., with an entry at the head of the queue, or with locations available in the queue, as required. Accordingly, indicia of queue status is maintained and tested by suitable queue logic control 514.

It should be appreciated that the foregoing issue conditions are only illustrative, and that various other system conditions are typically checked prior to issuing an instruction, as is well known in the art.

Signals indicative of the various issue condition checks are applied through combinational logic 508, which generates an issue control signal applied to the associated registers and arithmetic units when the conditions are met. The issue signal is also applied to the various status control units 510, 512, 514, to update those units to reflect the execution of the present instruction, e.g., the registers that the particular instruction uses as destinations are marked as busy until the instruction completes.

After an instruction issues, it generally takes a number of clock periods before execution is completed and the result of the instruction is produced. As a consequence, indicia of the particular register which is to receive the result must be stored for a number of clock periods. As will be hereinafter explained, result bus control unit 510 cooperates with a series of sequential latches (602) in this regard.

Figure 6:
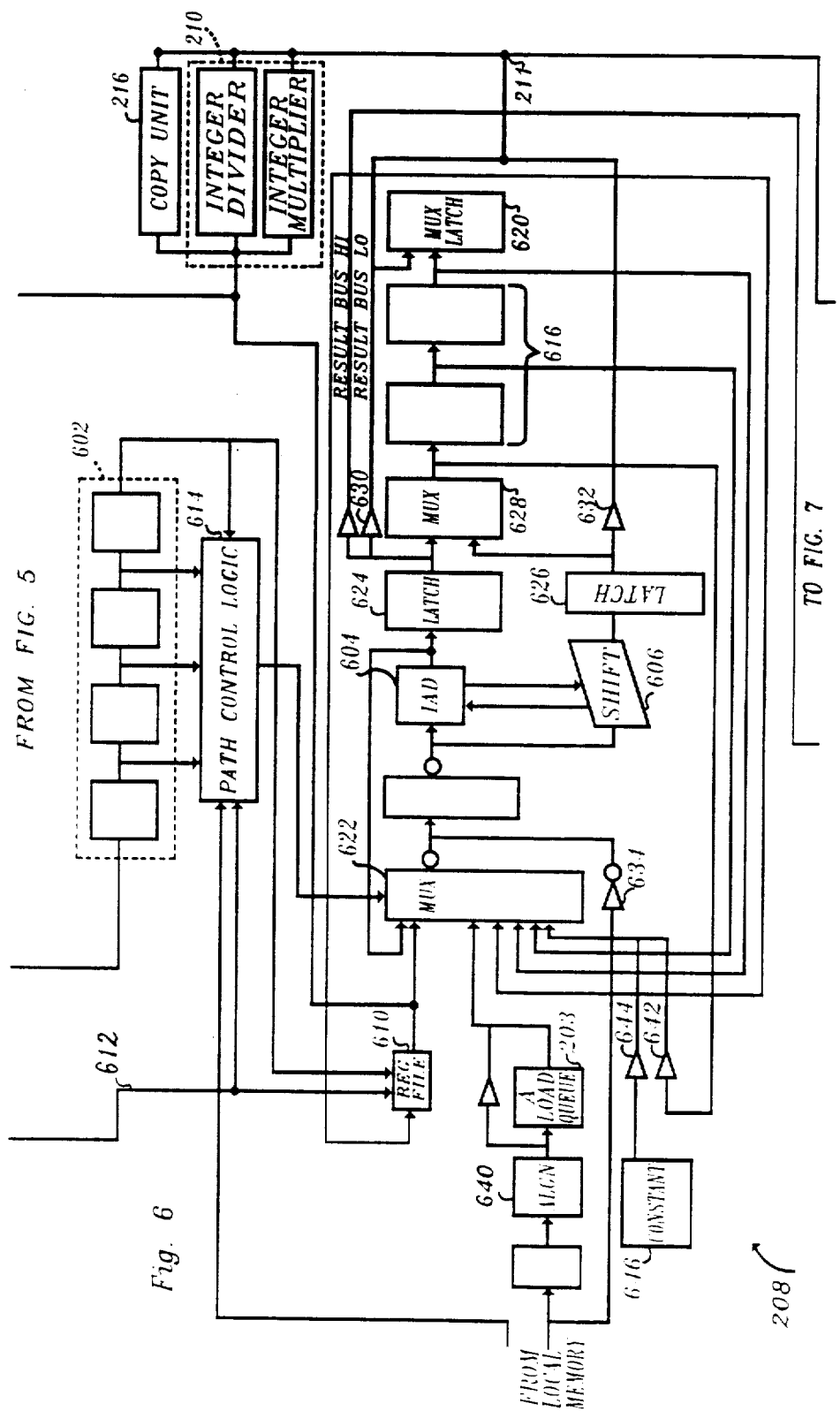
FIG. 6 is a schematic block diagram of the A registers 208 of FIG. 2.

Referring to FIG. 6, A register unit 208 comprises a sequence of latches, generally indicated as 602; suitable path control logic 614; a register file 610 comprising 30 32-bit registers; an 8 to 1 multiplexer 622; an integer adder 604 and shifter 606 interconnected to provide for the various logical and integer operations; respective latches 624 and 626; a multiplexer 628 and respective latches generally indicated as 616 and 618; a multiplexing latch 620; respective three state drivers 630, 632, 634, 644; and a register 646. The latches 602 are arrayed to cooperate as a shift register with an individual stage corresponding with each clock period in the maximum interval from initiation of instruction execution to a determination as to whether or not the instruction involves an address not reflected in the translation table of address unit 220.

The operands of all integer and address operations are provided through multiplexer 622 in cooperation with driver 634. The source of operands for integer and address operations are: the individual registers in register file 610, a load queue 203, or, in the event that the load queue is empty and properly by-passed, read memory data (through three state driver 634); a constant from reister 646; or, as will be explained, from one of the stages from the delay line formed by latches 624 and 626 and multiplexer 628, latches 616, 618 and multiplexing latch 620.

As previously noted, data from local memory 200 is typically communicated through a load queue 203. However, when a load queue 203 is empty, and an entry would be placed immediately at the head of the queue, queue 203 may be by-passed. Accordingly, provision is made for application of the memory read data directly to the integer adder/shifter logic unit 606. Control of three state driver 634 is suitably provided by hardware associated with a load queue 203.

Processor 100 typically operates either 32 bit or 64 bit words. However, if desired, an alignment unit 640 can be interposed before the A load queue 203 to facilitate use of quantities of less than 32 bits, such as, for example, 16-bit and 8-bit quantities.

When an instruction makes reference to a specific constant value, rather than a register or memory location, indicia of that constant is installed in constant register 646, for selective use as an operand.

When an addressing instruction issues (begins execution), it is not determined whether or not the instruction will hit in the translation table (i.e., will relate to an address having an entry in the translation table of address unit 220) for a predetermined number (e.g. 4) of clock periods. However, execution of subsequent instructions are often initiated during the intervening period, some of which may be completed prior to the instruction. If the addressing instruction misses (i.e., does not relate to an address having a translation table entry) however, a trap would occur, thereafter restarting the program with the addressing instruction. Accordingly, to prevent error from reexecution of the intervening subsequent instructions, a delay corresponding to the determination period for translation table fault is interposed between completion of instruction and loading the result into the A register destination.

More specifically, the instruction maintained in issue register 516 includes source register designators and destination register designators, identifying the registers from which the instruction operands are to be taken, and the destination register in which the result of the operations are to be stored, respectively. The source register designators are applied without interposed delay to register file 610 to facilitate application of the contents of the designated source register to multiplexer 622. The register destination designators, however, are maintained by bus control 510 until the issuing of the instruction by logic 508 as well known in the art, and are thereafter shifted through a series of latches, i.e., latches 602, corresponding to the shift register comprising multiplexer 628, latches 616, and multiplexing latch 620. The destination designators are applied to register file 610 after the appropriate delay by latches 602.

Accordingly, before getting the contents of a designated source register, a determination is made to ensure that the designated source register is not the destination register of a pending instruction. More specifically, the source register designators are applied to path control logic 614. Path control logic 614 then tests the contents of the individual latches 602 to determine if the source register is referenced therein. If not, path control logic 614 generates a control signal to multiplexer 622 to cause MUX 622 to access the contents of the designated register in register file 610 and apply it as an operand to integer adder 604/shifter 606. If, however, one or more of latches 602 reference the designated source register, then path control logic 614 generates a signal to multiplexer 622 so that the output of the stage of the shift register 628, 616, 620, corresponding to the stage of the shift register formed by latches 602 holding the most recent reference to the source register is utilized as the operand rather than the contents of the designated source register itself. Thus the instruction is performed using operands current with the appropriate state of the program. If a translation table fault does occur and the program is restarted with the instruction causing the fault, the subsequent instructions will be repeated. However, since the instruction has not affected the contents of the registers in register file 610, no error will result from the repetition of the instructions.

X-register unit 212 is substantially similar to A register unit 208.

Referring again to FIG. 1, the input-output (I/O) portion of the computer system 100 provides controlled transfer of information from peripheral devices to main memory so that programs resident there may operate on the data and, thence, processed data may be transferred from memory back to those peripherals. An I/O system is comprised essentially of an I/O multiplexer (IOM) 108 and up to 16 I/O processors (IOPs) 110. The IOPs are connected to the interconnection network of the computer system through the I/O multiplexer 108. Each IOP is also connected to a standard bus to allow conventional low and medium-speed peripherals to be attached. In a particularly preferred embodiment, the IOPs are capable of handling peripherals requiring an aggregate bandwidth of about 5 Mbytes per second. The IOPs communicate with each other and with the processor 102 via messages in memory and interprocessor interrupts.

I/O Multiplexer 108 performs two logical functions: dividing memory bandwidth among IOPs 110 and providing interrupt message facilities. The IOM 108 logically subdivides a memory port into independent channels, one for each IOP 110. In turn, each IOP channel is subdivided into sixteen subchannels, allowing IOM 108 to support up to 256 logical channels. IOM 108, if desired, further provides local block cacheing of data, and word-to-block assembly and disassembly for each logical channel.

Figure 3:
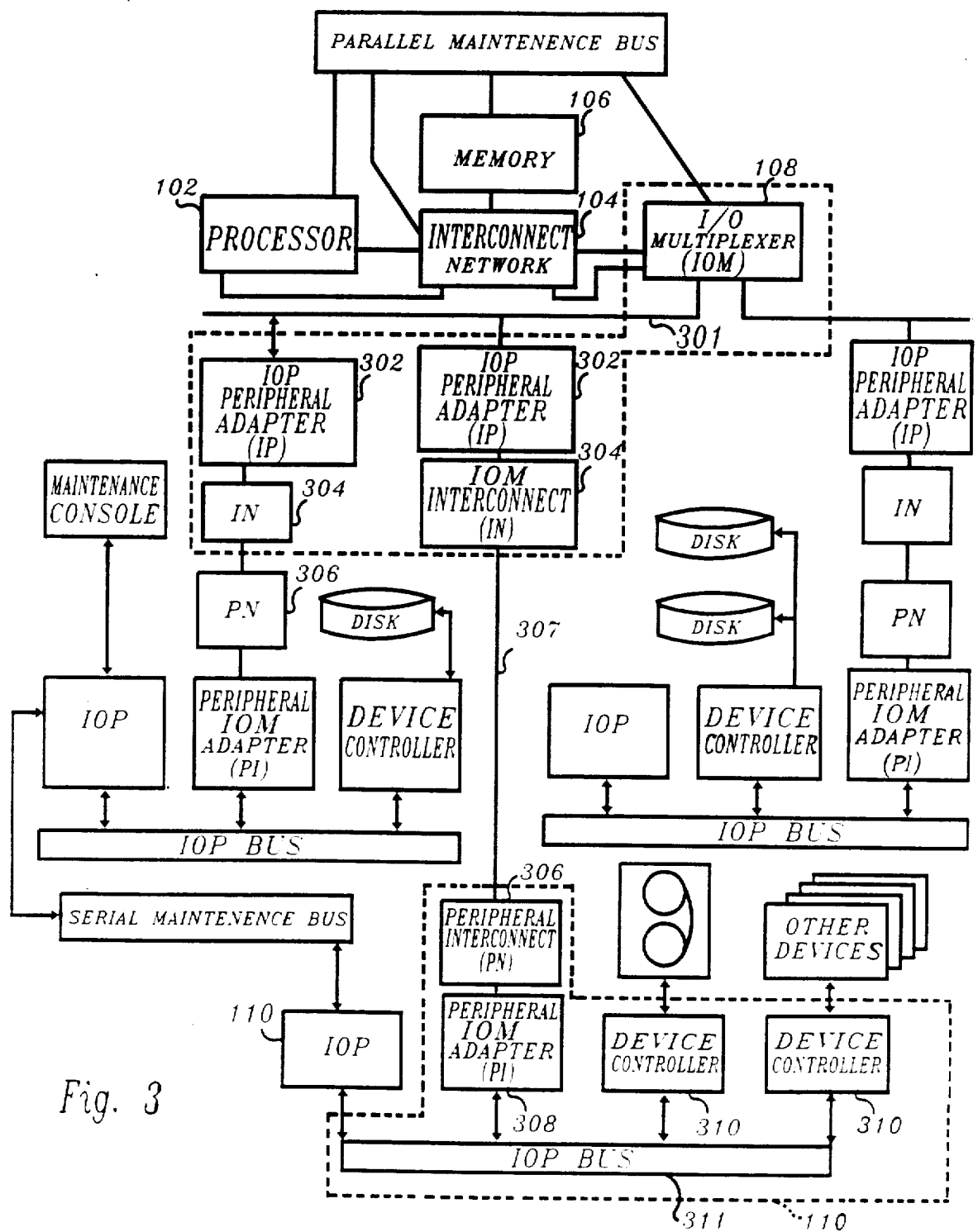
FIG. 3 including 3A and 3B, is a schematic block diagram of the I/O portion of the computer system of the present invention.

Referring now to FIG. 3, in a preferred embodiment of the present invention, IOM 108 supports an IOM bus 301 of 8 bytes plus parity, an address of 4 bytes plus parity, and control; an IOM bus 301 which is 8 bytes wide and which has a maximum bandwidth of about 180 Mbytes per second. In a particularly preferred aspect, two interleaved busses of 90 nanoseconds in actuality are used to give an effective bus time of 45 nanoseconds. The IOM bus, regardless of the highly preferred parameters aforesaid, is desirably synchronous with request/grant arbitration for the next bus cycle being overlapped with the current bus cycle. A scheduling scheme is adopted to assure that the IOPs are serviced in a fair way.

The I/O system is designed to handle peripherals requiring a bandwidth of up to about 45 Megabytes per second. In a highly preferred embodiment, each IOP 110 is comprised of a Multibus I based computer system, featuring a processor card with a microprocessor such as a National 32000 series microprocessor, memory management hardware, an interrupt controller, a timer, two serial I/O lines, ROM, and up to 512 Kbytes of RAM. The ROM most preferably contains diagnostic and deadstart code for the IOP. The serial line(s) can be used for diagnostics and error logging. The card is configured with a multi-master interface and the RAM can be accessed from Multibus. This highly preferred implementation further includes interfacing. High speed peripherals, primarily disks, desirably are interfaced through new standard busses, such as Multibus II or VME, providing transfer rates of 10 or more Mbytes per second. Local area networks, such as the one marketed as HYPERchannel by Network Systems Corporation, are supported by compatible interface cards connected directly to the IOM or IOP.

Interrupts are the primary mechanism for coordinating communication among the IOPs and the processor 102, with interrupt messages carried as part of the IOM bus. For interrupts involving processor 102, a synchronization bus is used to pass the interrupts. Each IOP can send an interrupt to another IOP or to Processor 102.

Figure 3A:
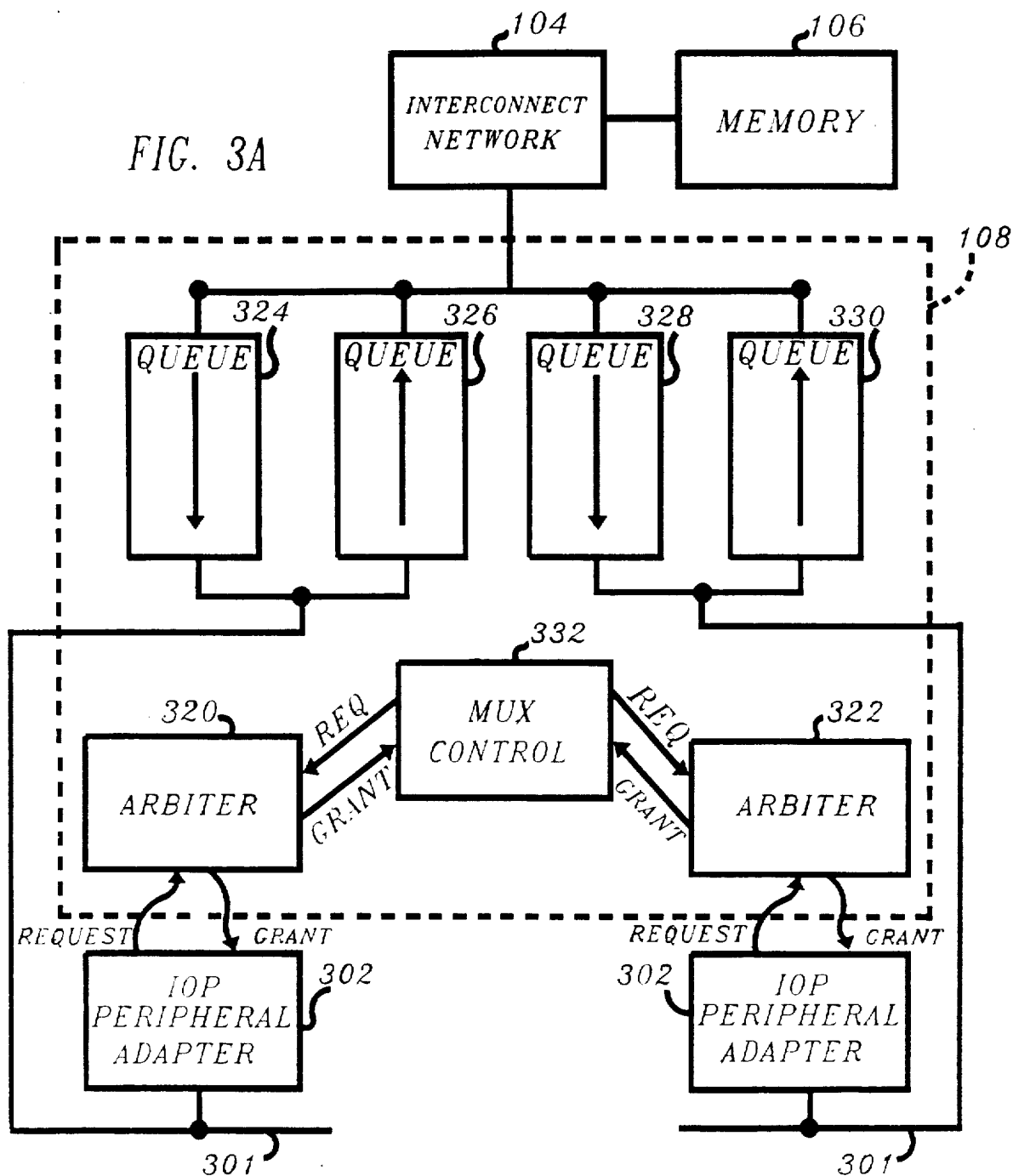
Figure 3B:
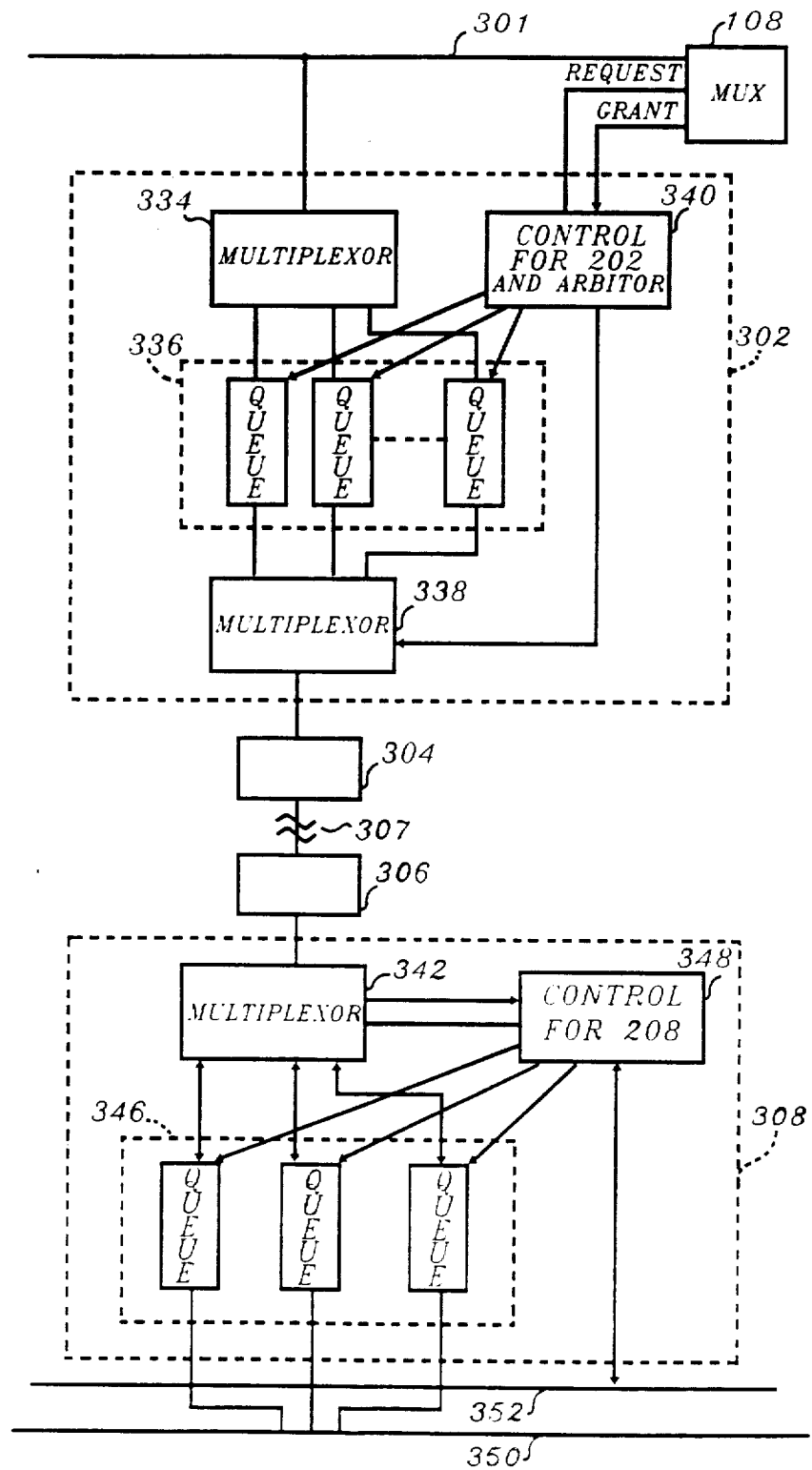

The most preferred implementation of the I/O system aforesaid is shown diagramatically in FIGS. 3–3B. Turning to those figures, in conjunction with FIG. 1, the I/O multiplexer 108 (IOM) provides a first level interface to memory, segmenting an IOM bus 301 into a plurality of discrete bandwidths allowing information to be transferred through main memory into a number of logically equivalent but physically separate components as will be described more fully below. Respective input/output peripheral adapters 302, sometimes referred to as an "IOP Adapter", or "IP", are provided to segment or subdivide the bandwidth of each channel IOM bus 301 yet further into 16 subunits. IOP adaptor 302 will be more fully described in conjunction with FIG. 3B.

Communication with remote peripherals is facilitated by standard data transmission techniques, such as, for example, through a standard RS422 data link. More specifically, IOP adapter 302 operates in conjunction with an input/output interconnect 304, referred to alternatively as an "IOM interconnect" or "IN" driver, coupled through a comm (data) link 37 to a peripheral interconnect (PN) receiver 306 resident at the peripheral. Where data or information is transmitted as conventional signal, data link 307 may be most conveniently a parallel cable; however, other communications media, such as a fiberoptic or microwave link, may be utilized. Peripheral interconnect (PN) 306 drives a peripheral IOM adapter ("PI") 308.

Peripheral interconnect adapter (PI) 308 provides a logical interface to a local IOP bus 311. IOM adapter 308 converts references to addresses and data appearing on the IOP bus into logical channel requests which ultimately effect the transfer of information from main memory 106; the peripheral IOM adapter (PI) 308 is preferably designed to segregate some of the address space comprising the IOP bus into sixteen logically equivalent spaces, represented by a logically mapped sequence of addresses on the IOP bus correlated to memory unit 106. This arrangement is noteworthy in that more than one IOP may function concurrently, in a parallel array whereby information may be transferred from local IOP buses to the main memory. The peripheral IOM adapter (PI) 308 also functions to convert system interrupts into forms suitable for the local IOP bus, and to facilitate communication from IOP to IOP or from IOP to the processor 102. A suitable PI 308 will be more fully described in conjunction with FIG. 3B.

In the foregoing regard, there are two forms of communication: data transfer to memory; and interrupt messages. Interrupt messages are communicated over the interrupt synchronization bus intermediate, the interconnection network 104 and I/O multiplexer 108. The central processor 102 initiates an I/O operation by making a request on the interrupt synchronization bus which communicates to multiplexer 108 a message containing an address specifying the IOP 110 for which the message is destined. That message or signal is communicated via bus 301 (interconnecting the peripheral adaptors 302 and the multiplexer 108), peripheral adapter 302, and data link 307 interconnect between IN 304 and PN 306, to peripheral IOM adaptor 308. At that juncture, the message will instruct IOP 308 to initiate the I/O operation.

Data from peripheral devices may be communicated to memory 106. A device controller 310 is included within IOP 110, serving to initiate the transfer of data to the PI 308. This data is placed on a logical channel which is then multiplexed onto the interconnect link 307. In turn, the data reaches the IP 302, and ultimately issued onto the IOM bus 301; the information is queued while IP 302 makes a request of multiplexer 108 to transfer the data along bus 301. Upon the granting of that request, multiplexer 108 receives the command and or data. Where data is involved in the transfer, multiplexer 108 will then initiate a request of the interconnect network 104 (FIG. 1) to receive or transmit data to memory 106.

Referring now to FIG. 3A, I/O multiplexer 108 includes an arbiter control for the IOM bus 301, assigning mastership or hierarchy so that data can be transferred meaningfully. A tandem array of suitable arbiters 320 and 322 is provided to receive and process requests for use of bus 301, assigning it to a particular requesting device on a fairness principle. Eight peripheral adaptors 302 are associated with each of the arbiters 320 and 322, connecting one-half of the bus 301. Thus, the system is segmented, receiving requests from the internal control object 332 of multiplexer 108 for use of the bus 301. In other words, multiplexer 108 comprises respective fair access arbiters 320 and 322, each serving one-half of the sxteen request lines to the multiplexer. Multiplexer 108 includes as well an array of first-in, first-out (FIFO) queues 324, 326, 328 and 330, interposed between interconnect network 104 and the busses 301. The bus 301 is divided into two halves, each half servicing a respective group of eight of the sixteen physical channels and consequently eight peripheral adaptors 302. The peripheral adaptors 302 are associated wirh respective arbiter logic units 320 and 322 under the control of a microprogrammed multiplexer control circuit 322. Each of the eight peripheral adaptors 302, comprising one half or the other of the system, is coupled to the associated arbiter logic through request and grant lines. While shown as two physically distinct lines, it may be that only a single discrete line is used.

In operation, when data is to be transmitted to memory 106 from a particular IP 302, that peripheral adaptor 302 makes a request of the associated arbiter, e.g., when arbiter 320 determines it is appropriate for data transmission to occur on bus 301, it will issue a "grand" response to that peripheral adaptor 302. The grant will initiate data transfer along bus 301 into multiplexer 108 and thence to queue 326. Multiplexer control 332, having received the data within queue 326, itself initiates a request of memory 106 via interconnection network 104. When memory 106 has accepted the request, the data is transferred out of the queue 326 through interconnect 104 and into memory 106.

In the case where data from memory 106 is to be transmitted to peripheral adaptor 302, multiplexer control 332 requests information from memory 106 via interconnect 104. Memory 106 retrieves the requested data and transmits the data to interconnect 104 and into queue 324 of multiplexer 108. When data has arrived in queue 324 in the multiplexer, MUX control 332 requests use of bus 301 via the arbiter 320. Upon determination by arbiter 320 that it is appropriate for data transfer along bus 301, it responds to MUX control 332 via a grant line and data is transferred from queue 324 along bus 301 into the appropriate peripheral adaptor 302.

As noted above, the system of the present invention facilitates the multiplexing of sixteen logical channels over the same physical data link. This is achieved, in part, by employing sixteen logically separate sets of queues in IP adaptor 302 and PI adaptor 308. Referring now to FIG. 3B, IP adapter 302 comprises a standard multiplexer 334, sixteen bidirectional queues 336, which are organized as FIFO queues, standard multiplexer 338 and the necessary control and arbitration circuitry 340, most preferably comprised of a microprogrammed control. The PI adaptor 308 is comprised of a standard multiplexer 342, sixteen bi-directional queues 346, also organized on a first-in, firstout basis, and microprogrammed control 348.

Disposed intermediate the two segments are interconnects 304 and 306 present to drive the data on an appropriate medium (307). As previously noted, customarily, the interconnect medium is a parallel cable, although fiber optics or another variety of desirable media might suitably be employed. Each of the interconnects 304, 306, regardless of the medium, includes a driver and receiver to communicate across the link (307). A data link conceptually similar to a standard RS422 communications link, except for variations in protocol, may be implemented at the options of the designer with due consideration for the medium employed. Regardless of such a variation, the microprogrammed control 348 takes an address from the common bus, identified 350 in FIG. 3B.

Bus 350 implements sixteen logical channels by using sixteen separate address spaces. When IOP 110 requires a transfer to memory, it must utilize one of the sixteen logical channels and, when ready to do so, instructs a device controller 310 (FIG. 3) to transfer data to or from one of the memory-mapped address spaces on the bus 350. This will cause a transfer through one of the sixteen queues 346, which is separate from data in any of the other queues. Once the data is in the queues the microprogrammed control 348 monitors the array and includes arbitration circuitry which will arbitrate on fair principles which of the sixteen queues will be enabled to pass through the multiplexer and communicate with the peripheral interconnect 306. Only one of the queues can pass data through to PN 306 at a given time, but each has an equal opportunity to do so. Consequently, the system is rendered vastly more adaptable by means of this multiplexing design; if only one or two of the sixteen logical channels is/are open while the remainder are closed, then the, e.g., two queues that are open will each enjoy one-half of the full bandwidth of the physical data link between interconnected elements 304 and 306, not simply 1/16th of the available bandwidth while the rest is under-utilized.

Once the data is transmitted via the link 307 and is driven to the receiver side of the interconnect IN 304, it will reach the IP 302. On that occurrence, microprogrammed control 340 determines the origin of the logical channels for which this data emanated in the PI 308 and assigns that transmitted data to a respective one of the queues 336. For example, information or data from logical channel 3 of PI 308 would be routed specifically to the queue allocated for channel 3 of the IP 302. The microprogrammed control 340 constantly monitors the queue content 336 sizes and, once it detects a queue size that it deems to be of minimum granularity (i.e., size) for a transfer on bus 301, the control will make an arbitration request to multiplexer 108. When MUX 108 delivers to control 340 the "grant" it awaits, the control 340 will initiate a data transfer from respective queue 336 through the multiplexer 334 to bus 301 and thence to multiplexer 108, completing a control sequence.

Assuming the foregoing to have been a write sequence, a read sequence occurs in precisely the same way insofar as the queues 336 and 346 are bidirectional. A read sequence is instituted by the transmission of a control message from IOP 110 through PI 308 into IP 302, instructing the control 340 to read a specified block of data from system memory 106. Subsequently, multiplexer 108 will accommodate writing, actually arbitrating for bus 301, transferring the data through one of the queue buffers 336 under control of arbiter 340 through multiplexer 338, ultimately through data link 307 to arrive at peripheral adaptor 308. From there the IOP 110 is notified that there is data available and it reads the data out of one of the queue channels 346 through bus 350. As the IOP 110 always has control, it opens one of the logic channels to facilitate this flow of data.

The IOP 110 is not required to pass data back and forth through itself. Rather, it tells the peripheral controllers, such as disk controllers or tape controllers (which are preferably DMA devices), to communicate directly with the PI 308. Accordingly, a direct DMA transfer may be accomplished between the peripheral controller and memory 106, albeit through the bus 350. However, since the IOP 110 is not between the PI 308 and the device controller 310, it may wait for the device controller 310 to transfer data directly and simply be notified that the transfer is complete at that stage. Although the transfer is a direct DMA transfer in one sense, in actuality the transfer is through the entire I/O system; but, from the standpoint of the device controller, the I/O system is transparent. This avoids the delay customarily associated with other systems and reduces the bus traffic by ½.

Figure 7:
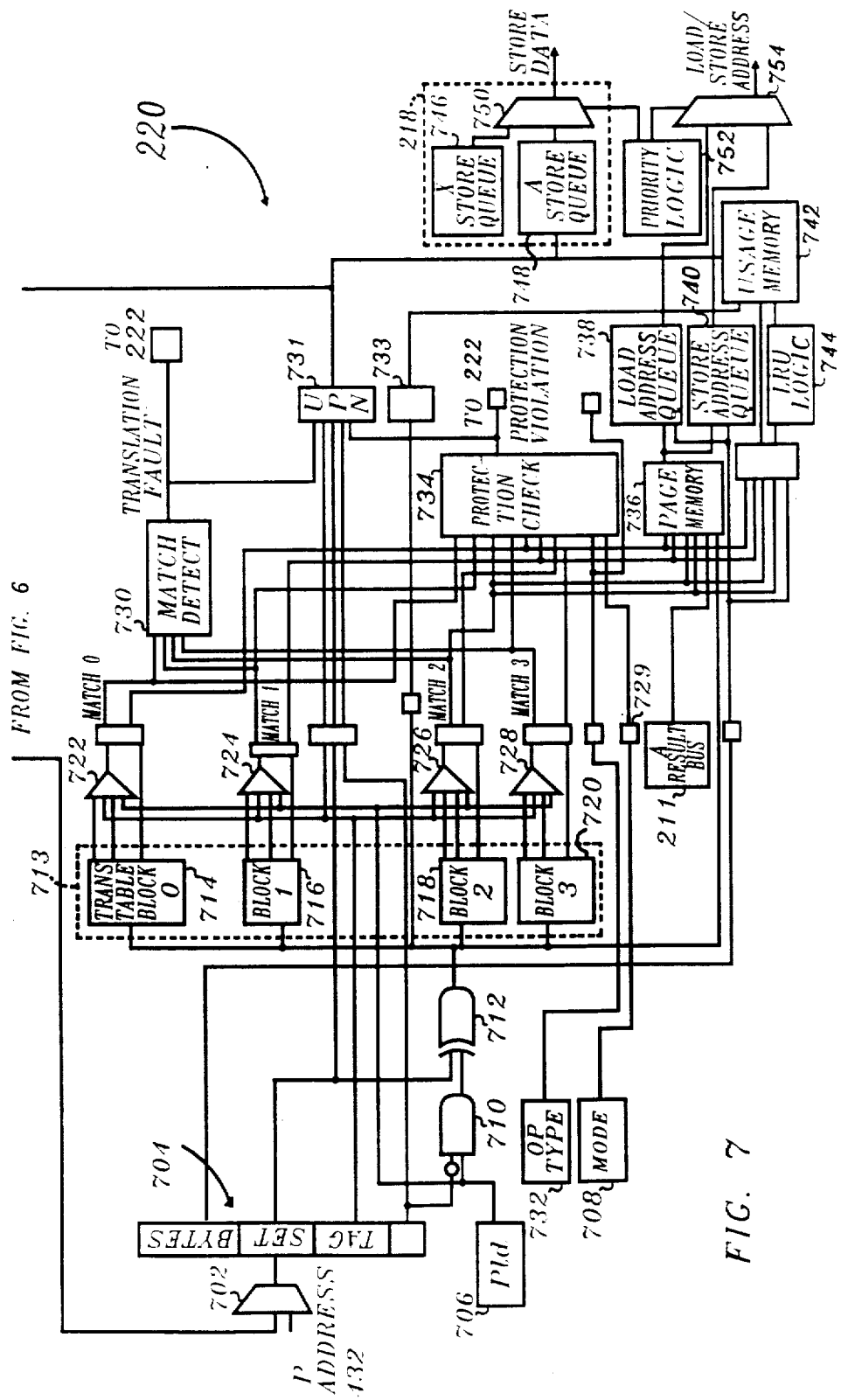
FIG. 7 is a schematic block diagram of address unit 220 of FIG. 2.

As previously noted, address unit 220 is utilized to translate virtual addresses provided by user programs into physical addresses corresponding to specific physical locations in memory unit 106. Referring now to FIG. 7, address unit 220 comprises: a 4K by 32 bit "Tag" memory 713 nominally divided into four blocks, 714, 716, 718, and 720; respective comparators 722, 724, 726 and 728; pipeline latches, generally indicated as 729; suitable combinatorial logic to detect the absence of favorable comparisons, a register 731 for receiving and storing the virtual address in the event no match is found in tag table 713; suitable protection check combinatorial logic 734; a 16 bit by 4K page memory 736 for storing indicia of physical page numbers corresponding to each of the addresses reflected in tag memory 713; a load address queue 738; a store address queue 740; a 2 bit by 4K usage memory 742 for storing indicia of the last location of the four corresponding locations of the blocks of tag memory 713 that were last to have been referenced and last to have been modified; and suitable combinatorial logic 744 to determine which of the blocks of translation tables 713 is presently referenced.

Tag memory 713, page memory 736, and usage memory 742, cooperate to form the translation table (tag memory 713 providing bits 0-31, page memory 736 providing bits 32-56, and usage memory 742 providing bits 57-63), which contains 4096 translation descriptors that are organized into 1024 sets with four descriptors per set. The translation descriptors are 64 bits long. However, some bits are unused. Each translation descriptor (depicted in FIG. 8 as 810) includes:

A 10 bit process identifier (PId) field utilized to discriminate between the different processes which concurrently have associated entries in the table (use of the PId field permits context changes without purging the entire translation table);

An 8 bit tag field, utilized for discriminating between blocks in the translation table;

A 2 bit protection (PR) field, indicating the operations allowable in the page (allowable operations are dependent on the current operating mode, either supervisory or user);

A 16 bit page number field containing the physical address of the page (i.e. the sixteen most significant bits of the physical address);

A 1 bit local memory flag indicating whether data residing in the page may be held in the local memory 200 (if the L bit is set to 1, then the data may be held in local memory, otherwise, the data may be held only in central memory 106);

A 1 bit written (W) flag, set when an instruction modifies the page. This bit is used when a page must be removed from main memory to insure that it is written back to secondary memory as appropriate;

A 1 bit referenced (R) flag, which is set when any instruction references the page for instruction fetching, reading or writing (this field is used for implementing page replacement policies such as translation descriptor maintenance).

The process of translating a virtual address into a physical address will now be described. The need to translate a virtual address into a physical address typically arises either when the contents of program counter 402 do not correlate with a location in instruction cache 400 or in connection with a load/store instruction. Accordingly, the contents of program counter 402, and the load/store address from A registers unit 208 are selectively loaded through a multiplexer 702 to a register 704 (typically maintained in restart unit 222). The contents of register 704 is the virtual address to be translated, including nominal byte, set and tag fields.

Also maintained in restart unit 222 is a PId register 706 for storing indicia of a process identifier assigned by processor 102, as known in the art, to the individual process to which the instruction at issue relates.

More specifically, each process having entries in the translation table is assigned a 10 bit process identifier (PId) by the system software. The PId for the process currently being executed is stored in register 706. For purposes of address translation, the virtual memory space is divided into two halves, depending on the highest order bit (bit 31 of the descriptor; bit 9 of the PId). Additionally, indicia of the operation type, and mode (supervisory or user) are stored in registers 732 and 708 respectively.

In general, when translating an address, the ten bits of the virtual address set field in register 704 are combined using an exclusive OR operation with the ten bits of the translation process identifier contained in register 706. The resulting ten bits are used to address one of the 1024 locations in each of the blocks of tag memory 713 and the corresponding locations in page memory 736 and usage memory 742. Each of the four tag fields from the descriptors are then compared with the tag field of the virtual address and each of the four process identifier fields from the descriptors are compared with the translation process identifier. If both comparisons yield a match with one of the descriptors (there should be at most one), then the matching descriptor is used to complete the virtual to real address translation; the physical address is generated by concatenating the page address of the designator (in page memory 736) with the byte field of the virtual address. A check is made to determine whether the requested operation may be performed in the page by examining the protection field (PR) of the descriptor. In the case of a successful address translation (hit, i.e., exactly one tag match occurred) and if privilege is not violated, the reference bit (R) of the translation table descriptor is set. If the operation modifies the contents of the page, the written bit (W) of the translation descriptor is also set (in usage memory 742).

In the event of a programming error in the operating system, it is possible for multiple translation descriptors to match. If this does occur, the protection field (PR) is checked in each of the descriptors. If none of them violates protection, one of the descriptors (arbitrarily chosen) is used to complete the address translation.

If there is no match as to tag field and process identifier, then there is a translation table "miss" and a translation fault trap is effected. In the case of a translation table miss, the sixteen most significant bits of the virtual address are placed in untranslatable page number register 731 for use by the operations system software.

As noted above, when the virtual address in register 704 does not correlate with the tag field and process identifier of any of the translation descriptors in tag memory 713, a translation fault trap is effected. A translation fault trap causes a transfer of control to the operating system, and the operating system begins execution of a routine at a location specifically set aside for translation faults. The operating system checks a page table maintained in main memory 106 to determine whether the requested page is in main memory. If so, it forms a translation descriptor for the requested page and places it in the translation table, replacing one of the descriptors then resident in the table, utilizing a set of initialized translation entry instructions, provided for the purpose of translation table maintenance, i.e., the translation descriptor is entered into memories 713, 736, and 742 through registers 704, 706, 732, and 708, and the A result bus 211.

The replacement algorithm for the translation table descriptors is determined by the software using the usage history information (least recently used (LRU) bits) maintained in usage memory 742. Before the software replaces a descriptor, another translation table maintenance instruction, "read usage" is utilized to read the reference (R) and written (W) bits of the descriptor. The LRU bits are used to determine which descriptor to replace and the reference (R) and written (W) bits are used to update the page table in main memory. Once the descriptor has been written in the translation table, and the system returns to the user process, the address translation will succeed.

If the operating system finds that the requested page is not resident in main memory, the requested page is brought in from secondary memory, and the page tables updated. The translation table is then updated using the initialize translation entry instructions.

More specifically, in translating a virtual address to a physical address, after the virtual address is latched in register 704, the virtual address is hashed, in accordance with a predetermined algorithm, into the respective blocks of tag memory 713. The set field of virtual address 704 is applied to a bank of two input exclusive OR gates 712 (one for each bit; a single gate shown for ease of illustration). The respective bits of PId register 706 are selectively applied to the other inputs of the exclusive OR gates 712. Thus, addresses associated with different processes are distributed throughout tag memory 713. However, where the most significant bit of the virtual address in register 704 is a 1, (indicative of an address in system space and shared by all user programs), exclusive OR gate 412 is, in effect, disabled by application of a logic low level to the second inputs thereof by AND gates 710. Thus, system space addresses are not hashed.

Tag memory 713 is set up as a four-way set associative cache cooperating with the page table in main memory 106. The hashed set field address is applied to each of the nominal blocks of tag memory 713. The tag fields, PId field and protection fields of the locations designated in each of the four blocks are read, and the tag fields and PId fields applied to respective comparators 722, 724, 726 and 728 for comparison against the tag fields of the virtual address in register 704, and the contents of PId register 706, respectively. The determination is then made from the outputs of comparators 722-728 to determine whether or not any one of the four tag memory locations correlate with the virtual address and PId.

The operation type and mode in registers 732 and 708 are concurrently tested against the protection field of the respective locations of tag memory 713.

If favorable comparisons of the tag and PId fields, and operation type and mode are not found, signals are generated to restart unit 222 to initiate an appropriate trap. More specifically, if the virtual address tag field and PId do not correspond to those fields of any of the four tag memory locations, a translation table fault is indicated. In that case, "match detect logic" 730 generates a translation fault signal to restart unit 222 to initiate a translation table trap, and the contents of registers 704 and 706 are latched in an untranslatable page number register, generally indicated as 731. Control is then transferred to the operating system software, which updates the translation table (tag memory 713, page memory 736, and usage memory 742). Similarly, if the protection bits of the translation table descriptors do not correlate with the operation type and mode indicated in registers 732 and 708, an impermissible operation has been requested, and a signal indicative of a protection violation is generated to restart unit 222, to effect generation of a trap.

If the tag and process ID fields of the virtual address match those of one of the tag memory locations, and the operation requested is legal, address unit 220 proceeds to determine the physical address corresponding to that translation table designator. Specifically, the location in page memory 736 corresponding to the correlating location in tag memory 713 is accessed and loaded into the sixteen most significant bits of the appropriate address queue (load address queue 738 or store address queue 740). The byte field of the virtual address in register 704 is stored in the sixteen least significant bits of the address queues. The concatenation of the page address from page memory 736, and the byte field of the virtual address provides the physical address corresponding to the translation table designator.

The usage memory 742 is updated during the next clock period; least recently used logic 744 generates a signal indicative of the particular block in which the correlating designator resides, and the various usage bits are varied accordingly.

Thus, addresses are established in queues 738 and 740 corresponding to the data stored in store queues 746 and 748 in store unit 218. Respective multiplexers 750 and 754 operating under the control of suitable priority logic 752 selectively present the load/store address and store data to local memory 200.

The translation table descriptors are initially installed in tag memory 713, page memory 736, and usage memory 742 through use of instructions which cause A registers to be written into the tag memory 713 and page memory 736, and cause usage memory 742 to be cleared. In practice, a pair of instructions is used to load a descriptor into the translation table. An A register is read and bits 16-25 of the A register are loaded into the set field of 704, and used to address the desired descriptor. Bits 15-14 of the A register are used to select the desired block. The usage information in the usage memory is cleared as a result of loading the descriptor.

Figure 8:
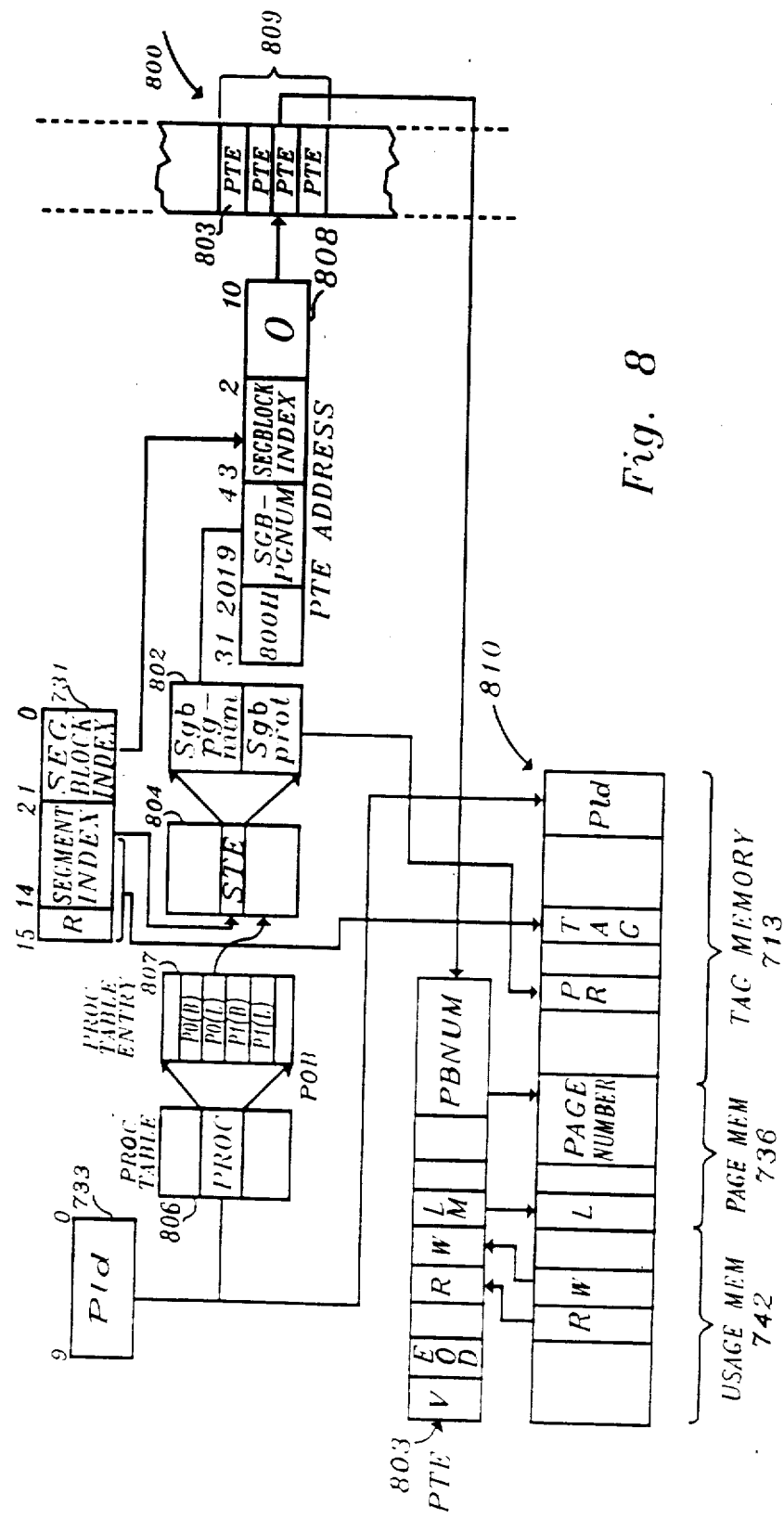
FIG. 8 is a schematic block illustration of a translation fault trap operation.

As noted above, when a virtual address does not correlate with any of the translation descriptors in the translation table (713, 736, 742), a translation fault trap transfers control to the operating system. Using the page table maintained in main memory, the software determines if the requested page is in main memory, and if so, the system software forms a translation descriptor for the translation page, and places the descriptor into the translation table. The structure of the page table in main memory is defined by the system software. Referring now to FIG. 8, the preferred embodiment of this process will be more fully described. The operating system software maintains a page table 800 in main memory 106, including a page table entry (PTE) for each page of virtual memory. PTE's are nominally grouped into blocks of a predetermined number of PTEs, e.g., four. Each block of the predetermined number of entries is referred to as a segblock. The set of pages corresponding to the segblock is referred to as a segment.

A respective "segment" table 804 is maintained in main memory 106 for each separate process being performed by the system, consisting of a segment table entry 802 for each segblock of virtual memory referenced by the process. The segment table entry includes the segblock number (identifying the segblock with which a page is associated) and provides indicia of the permissible activities by the particular process with respect to locations within the pages of the segblock.

In addition, the system software maintains a process (PROC) table 806, including an entry 807 for each process being undertaken by the system. Each process entry 807 identifies the base address and length of the segment table corresponding to that process. (In practice, the base address and length are provided for two opposing regions (P0 and P1) comprising the table, consistent with conventional practices).

As discussed in connection with FIG. 7, when a determination is made that a given virtual address does not correlate with any tag and PId fields in tag memory 713, the sixteen most significant bits of the virtual address from register 704 are loaded into an untranslatable page number (UPN) register 731, and the process id number from register 706 is loaded into register 733. Referring again to FIG. 8, the contents of UPN register 731 is nominally divided into four overlapping fields:

A 2 bit segblock index field (bits 0, 1);
A 13 bit segment index field (bits 2-14);
A 1 bit region (R) flag (bit 15); and
A 6 bit tag field (bits 10-15)

It should be recalled that the region (R) field (corresponding to the most significant bit of the virtual address) indicates whether the address relates to system space or user space. Since, by convention, descriptors for all system space addresses are continually maintained in the translation table, no address having an active R field should ever result in a translation table fault, and an R field value of 1 in UPN register 731 is indicative of an error.

The process ID number in register 733 is used to access entry 807 in the process table 806 corresponding to the particular process.

The process table entry is then accessed to identify the base address of the segment table 804 for the particular process. The segment index field of register 731 is then added to the base address of the segment table 804 to identify a particular segment table entry 802 corresponding to the segblock 809 associated with the particular virtual address reflected in register 731. If the contents of the segment index field are greater than the length of the segment table indicated by the process table entry 807, either a segmentation violation or a page fault, depending on circumstances, is deemed to have occurred.

A pointer 808 to a particular page table entry (pte) address is then constructed. Since page table entries are intended to reside in system space, bits 20-31 of pointer 808 are loaded with an 800 hexadecimal to ensure that the address is in system space, and thus resident in the translation table of address unit 220. The segblock (sgbpgnum) field from the segment table entry 802 is loaded into bits 4-19, and the segblock index field from register 731 is loaded into bits 2 and 3 of pte address pointer 808. Bits 0 and 1 are cleared to 0. The concatenation of the various elements loaded into pte address pointer 808 provide a virtual address of the particular page table entry 803 corresponding to the virtual address reflected in register 731.

Page table entry 803 includes a number of fields: a sixteen bit physical page number (physical address of the physical page) (PFNUM); a local memory bit (bit 25) providing indicia as to whether or not the page may be maintained in local memory 200 as opposed to main memory 106; the written (W) and referenced (R) bits indicative of whether any location in the physical page has been written or referenced since the last time these bits were cleared, and a validity bit (bit 31) indicative of a valid page table entry, i.e., that the corresponding virtual address relates to a location in main memory 106, as opposed to secondary memory, or none at all.

A translation table descriptor 810 is then generated by concatenating information from pte 803 with the protection information contained in segment table entry 802, the tag field of register 731, and the PId of register 733. The translation table descriptor 810 is installed into the address translation unit 220 as follows:

If the validity bit 31 of pte 803 is 1, indicative of a valid pte 803, a set number is constructed by exclusive ORing the PId 733 with bits 0-9 of the UPN register 731. The LRU bits associated with the constructed set number are read from usage memory 742 and used to determine the least recently used descriptor in that set. If a valid translation descriptor exists in that position, it is read out as previously described, and its R and W bits are inclusively ORed into the PTE associated with that old translation descriptor. The new translation descriptor 810 is then installed in the same position of the set determined above, thereby replacing the old translation descriptor.

If, when page table entry 803 is accessed, the validity bit 31 is 0, a page fault is deemed to occur, and the virtual memory page is transferred to main memory 106 from secondary memory in accordance with conventional techniques and the translation table descriptor 810 is then installed as previously described.

It should be appreciated that the present invention provides a particularly advantageous computer system employing virtual memory to permit efficient memory and I/O management in an interactive system environment. The large physical memory allows programs which frequently access all their data to be entirely resident in main memory. On the other hand, programs not requiring all their data to be resident in memory at once do not consume main memory they do not really need; the required memory management is done automatically by the operating system. Also, because the memory used by a program does not need to be contiguous, memory fragmentation is not a problem, and all of real memory can be efficiently used. Furthermore, interactive response time is often improved because a program does not need to be entirely swapped in before it can begin executing.

The implementation of virtual memory in accordance with the present invention provides greater flexibility than prior art systems. The operating system can use page table structures it deems optimal (single-level or two-level page tables for either hashed or direct look up). In addition, the operating system can anticipate which pages will be needed and preload the translation table prior to a context switch. This reduces the number of translation misses as a process begins execution. A computer system in accordance with the present invention may be constructed primarily of off-the-shelf advanced Schottky SSI and MSI logic circuits and 256K dynamic MOS memory integrated circuits.

If desired, remote diagnosis of hardware failures can be supported by inclusion of a microprocessor maintenance processor interfacing between built-in diagnostic hardware and communications hardware adapted for communication by telephone system. Service engineers can thus use the phone line to extract diagnostic information remotely.

A system in accordance with the present invention preferably uses a Berkeley 4.3 BSD UNIX operating system. Such an operating system provides advantageous networking support, accommodates virtual memory, and provides "Fast Filesystem". Support for networking resources makes computing resources more accessible to users, and provides a way of distributing those resources in an intelligent manner. The Fast Filesystem (initally implemented with the Berkeley 4.2 BSD release) design optimizes file block sizes and placement so that logically adjacent file blocks are close (from a seek and rotational point of view) on the disk. This property is advantageous in a system in accordance with the present invention in that it provides substantial disk bandwidth for individual processes. Accordingly, support for file locking and append-only files is present.

As noted above, various of the conductor/connections are shown in the drawing as single lines when in fact they comprise plural connections as is understood in the art. Further, various elements are shown as single components in the drawing, when in fact such elements comprise plural components, e.g., one for each bit of a signal, as is understood in the art. Further, the above description is of preferred exemplary embodiments of the present invention, and the invention is not limited to the specific form shown. These and other modifications may be made in the design and arrangement of the elements without departing from the spirit of the invention as expressed in the appended claims.

We claim:

1. A method for implementing virtual memory in a computer system comprising the steps of:
   a. maintaining in a memory a table containing entries indicative of the correlation of virtual memory addresses to physical memory addresses;
   b. maintaining, in a high speed memory, respective translation descriptors relating a variable group of virtual addresses to physical addresses, said descriptors being derivable from said table entries;
   c. comparing predetermined portions of a virtual address to be translated to said translation descriptors;
   d. if a matching translation descriptor is found, generating indicia of the physical address by combining a portion of the virtual address with a portion of the matching translation descriptor; and
   e. if a matching descriptor is not found, generating through a software algorithm a translation descriptor from said table, installing such generated translation descriptor in said high speed memory, then repeating steps c and d.

2. A method for translating a logical address to a physical address, comprising the steps of:
   a. maintaining in a memory translation descriptors relating a variable group of logical addresses to physical addresses;
   b. comparing predetermined portions of a logical address to be translated to said translation descriptors;
   c. if a matching translation descriptor is found, generating indicia of a corresponding physical address by combining a portion of the logical address with a portion of the matching translation descriptor;
   d. if a matching descriptor is not found, generating through a software algorithm, a translation descriptor corresponding to said logical address, installing said generated translation descriptor in said memory, then repeating steps b and c.

3. In a computer system of the type including a memory, processor means for selectively fetching instructions from memory and executing instructions, and an operating program, said memory being accessed by reference to logical addresses, the improvement wherein:
   said processor means includes:
   relatively high speed memory means, for storing translation descriptors, each of said translation descriptors corresponding to a nominal page of logical addresses, said translation descriptor correlating the logical addresses of said page to physical addresses in said memory;

means, responsive to indicia of a referenced logical address, for comparing a predetermined portion of said logical address to said translation descriptors in said high speed memory means and generating indicia of said comparison;

means, responsive to said indicia of said comparison, for generating indicia of a physical address corresponding to the said logical address in response to a favorable comparison, said physical address indicia being generated from said logical address and said translation descriptor;

and said operating program includes:

means for maintaining a table in said memory correlating logical addresses with physical addresses in said memory;

means, responsive to said indicia of said comparison, for generating a translation descriptor corresponding to the page including said logical address and installing said generated descriptor in said high speed memory means in response to an unfavorable comparison, said translation descriptor being generated from said table and said logical address in accordance with a software algorithm; and means for causing said means for comparing to reeffect said comparison after said generated descriptor is installed in said high speed memory means.

4. In the system of claim 3, the further improvement wherein said processor means further comprises:

means, communicating with said memory, for selectively accessing instructions and operands associated with said instructions from said memory;

instruction pipeline means, receptive of said accessed instructions, for processing said instructions and issuing individual instructions only after predetermined issue conditions relating to said individual instructions are established;

register means, responsive to said accessed instructions, for providing temporary storage and sequencing of operands associated with said instructions;

functional unit means, responsive to issued instructions from said instruction pipeline means, for selective effecting predetermined operations in accordance with said instructions upon an operand in a designated source in said register means and generating a result;

at least one first-in-first-out storage queue, having a predetermined number of stages;

bus means, resposive to said instructions, for effecting communication of said result from said functional unit means to said storage queue and for effective communication from said register means to said storage queue; and a first-in-first-out store address queue, having a stage corresponding to each stage of said storage queue, for maintaining indicia of a physical address in said memory in which the contents of said corresponding storage queue stage is to be stored.

5. The system of claim 4 wherein said instruction pipeline means comprises:

a first-in-first-out queue receptive of said accessed instructions;

an issue register for temporarily storing said instruction; and means for determining whether predetermined issue conditions have been met with respect to said temporarily stored instruction and responsively issuing said instruction.

6. The system of claim 4 wherein accessed instructions include source designators indicative of a source from which an operand is to be taken, and destination designators indicative of a destination in which the result of an operation is to be stored, and wherein said register means include:

a first delay line including a number of accessible stages corresponding to the maximum time interval from issuing an instruction to generation of said comparison indicia, said first delay line being receptive of said destination designators;

a second delay line including accessible stages corresponding to the stages of said first delay line;

a file of registers, addressed by said source designators and said delayed destination designators from said first delay line, said file of registers selectively storing the output of said second delay line in designated destination registers in accordance with said delayed destination designators, and providing the contents of designated source registers as operands to said functional unit means, in accordance with said source designators;

a first-in-first-out load queue receptive of indicia of bytes read from said memory;

a multiplexer, responsive to control signals applied thereto, for selectively applying an input to said second delay line, said input being chosen from a group of inputs comprising: the output of said load queue; indicia of the contents of a designated source register in said file of registers; and indicia of the contents of a selected stage of said second delay line; and means for generating said control signals to said multiplexer in accordance with the contents of the respective stages of said first delay line.

7. A computer system adapted to execute instructions referencing logical addresses comprising:

a memory including a plurality of physical addresses and containing a table correlating said logical addresses with said physical addresses;

means, communicating with said memory, for selectively accessing instructions from said memory;

instruction pipeline means, receptive of said accessed instructions for processing said instructions and issuing individual instructions only after predetermined issue conditions relating to said individual instructions are established;

register means, responsive to said processed instructions, for providing temporary storage and sequencing of operands associated with said instructions;

functional unit means, responsive to issued instructions from said instruction pipeline means, for effecting predetermined operations in accordance with said instructions upon an operand in a designated source in said register means and generating a result;

a high speed memory for storing a predetermined number of translation descriptors corresponding to a nominal page of logical addresses, each said translation descriptor correlating said corresponding logical addresses to physical addresses in said memory;

means for comparing a logical address referenced in an instruction to the translation descriptors in said high speed memory, and generating comparison signals indicative of the results of said comparison;

means, responsive to said comparison signal, for generating indicia of a physical address corresponding to said logical address, said physical address indicia being derived from the logical address and said favorably comparing translation descriptor;

address queue means including a plurality of stages for storing said physical address indicia for sequenced communication to said memory;

storage queue means, having stages corresponding to the stages of said address queue means and communicating with said register means and said functional unit means, for storing in said stages information to be stored in physical addresses designated in corresponding address queue means stage, the information in said storage queue means stages being communication to said memory in conjunction with communication of said physical address indicia; and means, responsive to said comparison signals, for effecting a software defined algorithm to generate a translation descriptor corresponding to the page including said logical address and entering said generated translation descriptor in said high speed memory in response to an unfavorable comparison, said translation descriptor being generated from said table and said logical address.

8. The system of claim 7 further comprising:

means for separating said accessed instructions into first and second instruction streams, said first instruction stream comprising instructions of a first category and said second instruction stream comprising a second category of instruction;

said instruction pipeline means comprises first instruction category pipeline means, responsive to said first instruction stream, for issuing instructions of said first category and second instruction category pipeline means, responsive to said second instruction stream, for issuing instructions of said second category;

said register means includes first register set means for temporarily storing and sequencing operands associated with said first category, and second register set means for temporarily storing and sequencing operands associated with instructions of said second category;

said functional unit means includes a first set of functional units associated with said first category of instruction, a second set of functional units associated with said second category of instruction, and copy unit means for operatively interconnecting said first and second sets of functional units;

said storage queue means comprises a first queue for storing information associated with said instructions of said first category to be stored in said memory, and a second queue for storing information associated with instructions of said second category to be stored in said memory; and said address queue means includes means for designating one of said first queue or said second queue as corresponding to an individual stage of said address queue means.

9. The system of claim 8 wherein said first category of instructions comprises integer computation and memory address computation and access instructions, and said second category of instructions comprises floating point computation instructions.

* * * * *